3,211,128
VACUUM EVAPORATOR APPARATUS
Roy F. Potter, Riverside, and George G. Kretschmar, Arlington, Calif., assignors to the United States of America as represented by the Secretary of the Navy
Filed May 31, 1962, Ser. No. 199,198
2 Claims. (Cl. 118—49.1)
(Granted under Title 35, U.S. Code (1952), sec. 266)

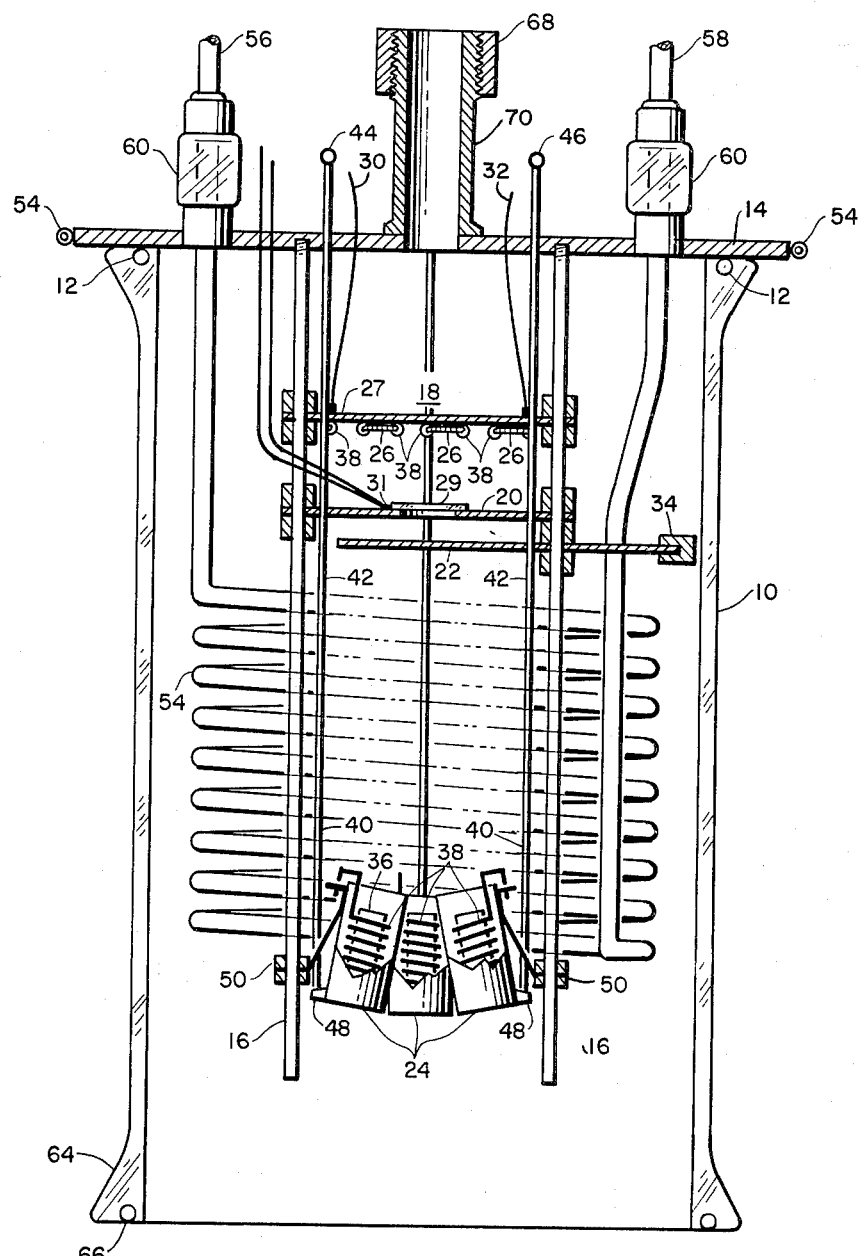

The invention herein described may be manufactured and used by or for the Government of the United States of America for governmental purposes without the payment of any royalties thereon or therefor.

The present invention relates to vacuum evaporator apparatus and more particularly to vacuum evaporator apparatus for preparing crystal films of the composition AB or mixed crystal films of the composition $AB_yC_{1-y}$.

The films prepared by the apparatus of the present invention are produced by the evaporation of the separate components, in a vacuum in such a way that the vapors condense and combine stoichiometrically on the surface of a rigid substrate of glass or other appropriate material. In order for the film to be truly stoichiometric the substrate must be heated to such a temperature that it will reject an excess of the component B in compounds of the form AB and will reject an excess of both B and C in compounds of the form $AB_yC_{1-y}$. Also the temperature of the apparatus must be below the condensation temperature for the component A and below the decomposition temperature of the compound.

The temperature of the crucible containing material A will determine the rate of film production. For the two component system the crucible containing material B must be at a temperature which will produce an amount of vapor which is in excess of the amount needed for the AB compound. For the three component system the ratio of the B and C crucible temperatures will determine the ratio of the vapor pressures of the B and C components and hence the value of y in the formula $AB_yC_{1-y}$.

The disadvantages of prior known methods for producing two component semi-conducting films have been the inconvenience of having to open the quartz apparatus every time the charges are changed or substrates are put in or taken out and the difficulty of getting independent temperature control of the substrate and of the two crucible heaters. The apparatus of the present invention provides for convenience of operation and for maintaining independence of control of the substrate temperature and of the several crucible temperatures. This is accomplished by bringing the electrical connections through a copper plate from which the apparatus is suspended so that the whole apparatus may be hung from the flanged end of a glass pipe and sealed with single O-ring seal. The substrate is "open" and heated from the top only by a wide area surface heater. The crucible heaters are independently shielded by compact double heat shields of tantalum so that the temperatures can be independently controlled. A cooling coil inside the vacuum space improves the temperature stability when water is circulated in its or it may be used for improving the vacuum by the circulation of a suitable liquid or gaseous refrigerant.

Accordingly, an object of the present invention is to provide an improved apparatus for preparing crystal films of the composition AB or mixed crystal films of the composition $AB_yC_{1-y}$.

Another object of the invention is to provide for preparing crystal films of the composition AB or mixed crystal films of the composition $AB_yC_{1-y}$ wherein independent control of the substrate temperature and the several crucible temperatures is maintained.

A further object of the invention is to provide an apparatus for preparing crystal films of the composition AB or mixed crystal films of the composition $AB_yC_{1-y}$ which has ease of operation.

Other objects and many of the attendant advantages of this invention will become readily appreciated as the same becomes better understood by reference to the following detailed description when considered in connection with the accompanying drawings wherein: there is shown in the single figure a preferred embodiment of the invention.

Referring now to the drawing there is shown in the single figure a container 10 which preferably is made of glass pipe with flanged ends grooved to accept O-rings 12 for sealing support plate which in practice is made of copper. Attached to supporting plate 14 are four steel supporting rods 16 (only two are shown). Three of the rods 16 are used for supporting the substrate heater 18, substrate holder 20, shutter 22 and heat shields 24.

Substrate heater 18 is made by threading twenty-five mil Nichrome heater coil closely spiraled through small diameter quartz tubing supported on the lower surface of a nickel supporting sheet 27. Heater coils 26 should be well oxidized in air before use in the vacuum. Electric current is fed from a current controller, not shown, to heater 18 by means of conductors 30 and 32. Welded to nickel substrate holder 20 close to the substrate 29 is an iron constantan thermocouple 31. Stainless steel shutter 22 is positioned just below substrate holder 20 and is provided with an iron counterpoise 34 and may be opened with external magnet (not shown).

Crucibles 36 for vaporizing the material to be collected on substrate 29 are made of quartz tubing sealed at one end. In practice a satisfactory size for the tubing was found to be nine mm. Each crucible is wound with a close spiral of forty mil molybdenum wire 38 which is welded to nickel wire 40 which is in turn silver-soldered to the heavy leads 42 which pass through the supporting plate 14 to terminals 44 and 46. Electric current is brought in through terminals 44 and 46 through leads 42 and 40 through an insulating piece of ceramic tube of small bore 48. The return for the current is through ground which is accomplished by connecting the other end of heater coil 38 to heater shield supports 50. Heat shields 24 (as shown in the figure) are of sufficient length to shield each of crucibles 26 from the other, but terminate a sufficient distance from substrate holder 20 to provide space in which the vaporized materials can intermix to form a film on substrate 29. A cooling coil 54 is provided inside the vacuum space to improve the temperature stability by circulating water in it or it may be used for improving the vacuum by the circulation of a suitable liquid or gaseous refrigerant. Inlet and outlet tubes 56 and 58 respectively are provided and are brought through supporting plate 14 and sealed with glass heat insulators 60. The vacuum within the sealed container 10 is maintained by attaching a suitable evacuating apparatus (not shown) to the opening 65 in base plate 67 on which container 10 rests. Flange 64 and O-ring seal 66 provide an air seal between container 10 and base plate 67. The vacuum is measured by attaching a suitable measuring apparatus (not shown) by means of flange connector 68 and pipe 70 which extends through supporting plate 14. A vacuum of about $2 \times 10^{-5}$ to $2 \times 10^{-6}$ torr has been found to be satisfactory.

In use, the temperature of the substrate 29 is closely monitored by thermocouple 31. The operating temperature must be determined by experiment, i.e., at different temperatures different amounts of material from the crucibles will be deposited on the substrate. For some films, e.g., InSb, the operating range is very small. For others, e.g., InAs, the operating range is quite wide. For mixed crystals, e.g., $InAs_y Sb_{1-y}$, the operating range is small for small values of $y$. It was found by experiment that a temperature of approximately 330° C. is required to produce crystalline films of indium antimonide on a glass or cadmium-sulfide substrate. The operating temperatures of the crucibles are also found by experiment by checking the films which are formed by the evaporated material to determine when the proper proportions are being formed on the substrate to give a stoichiometric substance. The temperatures can be duplicated and closely controlled by means of an ammeter in each heating circuit. For close control it is necessary to use a closely regulated line voltage source.

Obviously many modifications and variations of the present invention are possible in the light of the above teachings. It is therefore to be understood that within the scope of the appended claims the invention may be practiced otherwise than as specifically described.

What is claimed is:

1. In an apparatus for stoichiometrically forming a composite crystal film which includes vaporizing sources and a substrate holder each of which are maintained simultaneously at widely differing temperatures in order to maintain the correct proportions in forming the desired film, the combination comprising:
   (a) an open end container,
   (b) a support plate closing said container in a sealing relation of providing said container airtight,
   (c) supporting means mounted on said supporting plate and extending into said sealed container,
   (d) a plurality of crucibles for containing the materials to be evaporated mounted on said supporting means, each of said crucibles being individually heated and being surrounded by a heat shield so that each crucible is heat radiation shielded from each other for simultaneously and separately vaporizing said materials,
   (e) a substrate upon which said vaporized materials are deposited,
   (f) means mounted on said supporting means for supporting said substrate in said container spaced from said crucibles,
   (g) said heat shields terminating short of said substrate to provide a space in which the vaporized material can intermix prior to being deposited on said substrate,
   (h) temperature controlled heating means associated with said substrate means for maintaining said substrate at a predetermined temperature comprising heater coils suspended by quartz tubes from a flat heat reflector.

2. The apparatus of claim 1 wherein cooling means are contained within the sealed container for controlling the temperature of the interior of said container.

References Cited by the Examiner
UNITED STATES PATENTS

| | | | |
|---|---|---|---|
| 2,443,196 | 6/48 | Raines et al. | 118—49.1 X |
| 2,614,524 | 10/52 | Haynes | 118—49 |
| 2,759,861 | 8/56 | Collins et al. | 117—107 |
| 2,900,282 | 8/59 | Rubens | 118—49.1 X |
| 2,938,816 | 5/60 | Gunther | 117—107 |
| 2,996,418 | 8/61 | Bleil | 118—49 X |
| 3,015,586 | 1/62 | Toohig et al. | 118—49.1 X |
| 3,023,727 | 3/62 | Theodoseau et al. | 118—49 X |
| 3,047,424 | 7/62 | Suchoff | 118—49.1 X |

CHARLES A. WILLMUTH, *Primary Examiner.*

RICHARD D. NEVIUS, *Examiner.*